Patented Mar. 12, 1929.

1,705,074

UNITED STATES PATENT OFFICE.

EDWARD E. STAHLHUT, OF SUNNYSIDE, WASHINGTON.

WALL-TEXTURE COMPOSITION.

No Drawing. Application filed August 8, 1927. Serial No. 211,644.

My invention relates to wall texture compositions and the object of the invention is the production of a plastic composition to be used in plastering the interior walls of buildings and for any other purposes to which it is adaptable.

The composition in the commercial form consists of a filler of natural clay, a binder consisting of plaster of Paris, a coloring material such as whiting, and a sizing such as casein glue.

In preparing the composition I prefer to use the ingredients in about the following proportions—viz, thirty-seven pounds of natural clay, thirty-seven pounds of plaster of Paris, twenty-one pounds of whiting, and five pounds of casein glue. The foregoing ingredients are all in the powdered or pulverized form or are rendered in such form and when thoroughly mixed the composition is ready for the market.

The natural clay that I use is mined in the State of Washington and may be termed the prime factor in my composition as I know of no other substitute that will satisfactorily take its place. The mine comprises 160 acres located approximately fifteen miles northeast of the town of Sunnyside in Yakima county, State of Washington, and is the northwest one quarter of section 35, range 23, and township 12.

A general analysis of the natural clay made by a reputable chemists corporation of Seattle, Washington, gave the following:

| | Per cent. |
|---|---|
| Silica | 60.50 |
| Iron oxide | 2.14 |
| Alumina | 22.58 |
| Lime | 3.75 |
| Magnesia | 1.87 |
| Ignition loss | 8.80 |

To prepare the commercial or powdered compound for application to walls enough cold water is added to make a thick plastic mortar and then two and one-half quarts of boiled linseed oil is mixed in for every one hundred pounds.

Before applying the composition the walls may be sized with glue and the composition is spread on with a trowel or brush. It is very easy to apply and may be applied quite rapidly. When thoroughly dry any desired finish, such as paint, kalsomine, or the like may be applied to the surface of the composition.

My composition is adaptable for decorative impressions, is durable, tough and almost indestructible and retains some flexibility and elasticity when dry and readily adapts itself to all changes of temperature and weather. It is fireproof, impervious to water, adheres without cracking, is comparatively inexpensive, and, in fact, possesses all the desired properties of a wall texture.

Having thus described my invention what I claim and desired to secure by Letters Patent of the United States is:

1. A dry mixture adapted to be combined with water and linseed oil to form a wall texture composition consisting of thirty-seven pounds of powdered natural clay, thirty-seven pounds of plaster of Paris, twenty-one pounds of whiting, and five pounds of casein glue.

2. A wall texture composition consisting of thirty-seven pounds of powdered natural clay, thirty-seven pounds of plaster of Paris, twenty-one pounds of powdered whiting, five pounds of powdered casein glue, sufficient cold water to make a thick plastic mortar of the foregoing ingredients when thoroughly mixed, and two and one-half quarts of boiled linseed oil.

3. A wall texture composition consisting of thirty-seven pounds of powdered natural clay giving an analysis of 60.50% silica 2.14% iron oxide 22.58% alumina 3.75% lime and 1.87% magnesia, thirty-seven pounds of powdered plaster of Paris, twenty-one pounds of powdered whiting, five pounds of powdered casein glue, sufficient cold water to make a thick plastic mortar of the foregoing ingredients when thoroughly mixed, and two and one-half quarts of boiled linseed oil.

In witness whereof, I hereunto subscribe my name this 1st day of August, A. D. 1927.

EDWARD E. STAHLHUT.